US012767148B2

(12) United States Patent
Kuwahara et al.

(10) Patent No.: US 12,767,148 B2
(45) Date of Patent: Oct. 20, 2026

(54) DRIVER ABNORMALITY SIGN DETECTION DEVICE

(71) Applicant: Mazda Motor Corporation, Hiroshima (JP)

(72) Inventors: Junichiro Kuwahara, Hiroshima (JP); Dongmei Huang, Hiroshima (JP); Ryoma Sasaki, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 34 days.

(21) Appl. No.: 18/940,850

(22) Filed: Nov. 8, 2024

(65) Prior Publication Data

US 2025/0145162 A1 May 8, 2025

(30) Foreign Application Priority Data

Nov. 8, 2023 (JP) ................................ 2023-190687

(51) Int. Cl.

*B60W 40/09* (2012.01)
*B60W 40/08* (2012.01)
*B60W 50/00* (2006.01)
*G06V 20/59* (2022.01)
*G06V 40/18* (2022.01)

(52) U.S. Cl.

CPC ........ *B60W 40/09* (2013.01); *B60W 50/0097* (2013.01); *G06V 20/597* (2022.01); *G06V 40/18* (2022.01); *B60W 2040/0818* (2013.01); *B60W 2420/403* (2013.01); *B60W 2540/106* (2013.01); *B60W 2540/12* (2013.01);

(Continued)

(58) Field of Classification Search

CPC .................................................... B60W 40/09

See application file for complete search history.

(56) References Cited

U.S. PATENT DOCUMENTS

2011/0102166 A1* 5/2011 Filev .................... B60W 40/09 340/441
2014/0162219 A1* 6/2014 Stankoulov .......... G09B 19/167 434/65

(Continued)

FOREIGN PATENT DOCUMENTS

JP 2021-167163 A 10/2021

*Primary Examiner* — Davetta W Goins
*Assistant Examiner* — Pameshanand Mahase
(74) *Attorney, Agent, or Firm* — XSENSUS LLP

(57) ABSTRACT

A driver abnormality detection device is provided that detects an abnormality sign of a driver at a sufficiently earlier stage before driving actually becomes difficult. The detection device includes a control circuit configured to detect an abnormality sign of a driver based on visual line information from a visual line detector, driving operation information from a driving operation detector, and traveling environment information from a traveling environment information detector. The control circuit is configured to calculate a visual line abnormality degree, a driving operation abnormality degree, and a traveling risk of a vehicle. The control circuit is configured to combine the visual line abnormality degree, the driving operation abnormality degree, and the traveling risk to generate a comprehensive abnormality degree, and detect the abnormality sign of the driver when the comprehensive abnormality degree is a predetermined threshold value or greater.

20 Claims, 6 Drawing Sheets

(52) U.S. Cl.
CPC ... *B60W 2540/18* (2013.01); *B60W 2540/225* (2020.02); *B60W 2540/229* (2020.02)

(56) References Cited

U.S. PATENT DOCUMENTS

| | | | | |
|---|---|---|---|---|
| 2015/0149037 | A1* | 5/2015 | Lim | B60W 10/20 701/41 |
| 2016/0152237 | A1* | 6/2016 | Takahashi | B60W 30/12 701/41 |
| 2018/0197030 | A1* | 7/2018 | Yamataka | G06F 3/012 |
| 2021/0316736 | A1 | 10/2021 | Iwase et al. | |

* cited by examiner

DRIVER ABNORMALITY SIGN DETECTION DEVICE

CROSS-REFERENCE TO RELATED APPLICATION

The present application claims priority to Japanese application number 2023-190687 filed in the Japanese Patent Office on Nov. 8, 2023, the entire contents of which are incorporated herein by reference.

TECHNICAL FIELD

Embodiments relate to a driver abnormality sign detection device for detecting an abnormality sign of a driver in driving of a vehicle.

BACKGROUND ART

In recent years, development of a driver abnormality handling system which detects abnormality in a case where a driver falls into a state where the driver cannot safely drive and which automatically stops a vehicle has been progressing. For example, it is assumed that in a case where abnormality of the driver is detected by detecting collapse of a posture of the driver, the vehicle is gradually decelerated while staying on a lane, and if possible, the vehicle is caused to pull over to a road shoulder or the like and is automatically stopped.

In order to safely stop the vehicle while avoiding lane deviation, contact with an obstacle, and so forth in an occurrence of abnormality of the driver, it is preferable to shorten, as much as possible, a time from the occurrence of abnormality of the driver to the detection while preventing misdetection. Accordingly, a driver abnormality determination device has been suggested which aims to make an early determination about abnormality of a driver driving a vehicle (for example, see Patent Literature 1). In the device disclosed in Patent Literature 1, an abnormality determination unit receives outputs of an involuntary function detection unit, a base function detection unit, and a prediction function detection unit and makes a determination about the abnormality of the driver based on a detection target item and a determination condition which correspond to a driving scene recognized by a driving scene recognition unit. Specifically, driving functions of the driver are categorized into an involuntary function, a base function, and a prediction function, and further a combination of functions, which is suitable for detection of the abnormality of the driver, is decided in accordance with the driving scene (such as highway traveling or expressway traveling, for example). Furthermore, a determination is made about the abnormality of the driver based on a state of each of the functions included in the combination.

CITATION LIST

Patent Literature

[Patent Literature 1] Japanese Patent Laid-Open No. 2021-167163

SUMMARY

Problems to be Solved

However, when the present inventors conducted a traveling test for healthy persons and diseased persons by using an actual vehicle, not a driving simulator, the above-described related art was not necessarily able to always and early detect abnormality of a diseased person. The present inventors determined that since there are a variety of actual traveling environments compared to a simulator, the function suitable for detecting abnormality of a driver is not necessarily always the same even in one of the above-described driving scenes. Thus, detection of the abnormality only by predetermined combinations of driving functions which are set for each of the driving scenes is difficult. Further, the present inventors determined that since the diseased person also tries to drive as carefully as possible when the diseased person actually drives the vehicle, a change in actions of the driver, which accompanies lowering of the driving functions, is temporary and does not continue. Thus, precise detection of lowering of the driving functions in a short time is difficult. Consequently, in order to prevent misdetection and to certainly detect abnormality in the above-described related art, the present inventors determined that a timing of detection has to be delayed until lowering of the driving functions of the driver appears clearly and continuously. That is, there is still room for making abnormality sign detection for the driver be performed earlier and more highly precisely.

Embodiments have been made for solving such problems. In particular, embodiments are directed to providing a driver abnormality sign detection device that is capable of highly precisely detecting an abnormality sign of a driver at a sufficiently earlier stage before driving actually becomes difficult for the driver.

Means for Solving the Problems

For solving the above-described problems, embodiments are directed to providing a driver abnormality sign detection device detecting an abnormality sign of a driver driving a vehicle, the driver abnormality sign detection device including: a control circuit configured to detect the abnormality sign of the driver based on visual line information acquired from a visual line detection device, driving operation information acquired from a driving operation detection device, and traveling environment information acquired from the traveling environment information acquisition device. The control circuit is configured to acquire a predicted visual line based on the traveling environment information, acquire an actual visual line based on the visual line information, calculate a visual line abnormality degree based on a difference between the actual visual line and the predicted visual line, acquire a predicted driving operation based on the traveling environment information, acquire an actual driving operation based on the driving operation information, calculate a driving operation abnormality degree based on a difference between the actual driving operation and the predicted driving operation, calculate a traveling risk of the vehicle based on the traveling environment information, calculate a comprehensive abnormality degree by combining the visual line abnormality degree, the driving operation abnormality degree, and the traveling risk, and detect the abnormality sign of the driver in a case where the comprehensive abnormality degree is a predetermined threshold value or greater.

Because the controller calculates the visual line abnormality degree which represents the extent that the actual visual line differs from the predicted visual line, calculates the driving operation abnormality degree which represents the extent that the actual driving operation differs from the driving operation, calculates the traveling risk of the vehicle, and detects the abnormality sign of the driver in a case where the comprehensive abnormality degree obtained by combining the visual line abnormality degree, the driving operation abnormality degree, and the traveling risk is the predetermined threshold value or greater, a comprehensive determination is made about changes in a checking action and an operation action of the driver and a rise of the traveling risk, and the abnormality sign can thereby be detected. Consequently, even at a sufficiently early stage before the driver reaches an abnormality state where driving is difficult, such as a stage at which lowering of individual driving functions of the driver cannot be detected, the abnormality sign can early and highly precisely be detected.

The controller may be configured to acquire a maximum value of the visual line abnormality degree and a maximum value of the driving operation abnormality degree in a latest predetermined time and calculate a comprehensive abnormality degree by combining the maximum value of the visual line abnormality degree, the maximum value of the driving operation abnormality degree, and the traveling risk.

Accordingly, even in a case where the change in the checking action or the operation action of the driver is temporary and does not continue, the abnormality sign of the driver can be detected based on the comprehensive abnormality degree which reflects the change. Consequently, the abnormality sign can more certainly be detected.

The controller may be configured to acquire an average value of the traveling risk in a latest predetermined time and calculate a comprehensive abnormality degree by combining the maximum value of the visual line abnormality degree, the maximum value of the driving operation abnormality degree, and the average value of the traveling risk.

Accordingly, the abnormality sign of the driver can be detected based on the comprehensive abnormality degree which reflects the fact that the traveling risk increases not temporarily but averagely as a result of changes in driving actions of the driver. Consequently, misdetection of the abnormality sign due to accidental changes or the like in the driving actions, which are not caused by a disease of the driver, can be prevented, and the abnormality sign can more accurately be detected.

The controller may be configured to determine that the abnormality sign of the driver is detected in a case where the comprehensive abnormality degree is a predetermined threshold value or greater and a rise of the traveling risk is detected.

Accordingly, the abnormality sign of the driver can be detected in a case where the traveling risk rises as a result of the changes in the driving actions of the driver and a possibility of lane deviation or approach to an obstacle increases. Consequently, misdetection of the abnormality sign due to temporary changes or the like in the driving actions, which are not caused by the disease of the driver, can be prevented, and the abnormality sign can more accurately be detected.

The controller may be configured to acquire a prediction value of a saccade of the driver based on the traveling environment information, acquire an actual saccade of the driver based on the visual line information, and calculate, as the visual line abnormality degree, an extent that the actual saccade diverges from the prediction value of the saccade.

Accordingly, because the controller calculates, as the visual line abnormality degree, the extent that the actual saccade differs from the predicted, the change in the checking action due to lowering of perception functions, attention functions, or motor functions of the driver can be grasped by using a change in the saccade.

The controller may be configured to acquire prediction values of operation amounts of a steering wheel, an accelerator pedal, and/or a brake pedal based on the traveling environment information, acquire actual measurement values of the operation amounts based on the driving operation information, and calculate, as the driving operation abnormality degree, an extent that the actual operation amounts differ from the predicted operation amounts.

Accordingly, the change in the operation action due to lowering of the perception functions, the attention functions, or the motor functions of the driver can be grasped by using changes in the operation amounts of the steering wheel, the accelerator pedal, and/or the brake pedal.

Advantageous Effects

A driver abnormality sign detection device according to one or more embodiments can highly precisely detect an abnormality sign of a driver at a sufficiently earlier stage before the driver reaches an abnormality state where driving is difficult.

DETAILED DESCRIPTION

A driver abnormality sign detection device according to an embodiment will hereinafter be described with reference to the attached drawings.

[System Configuration]

Figure 1:
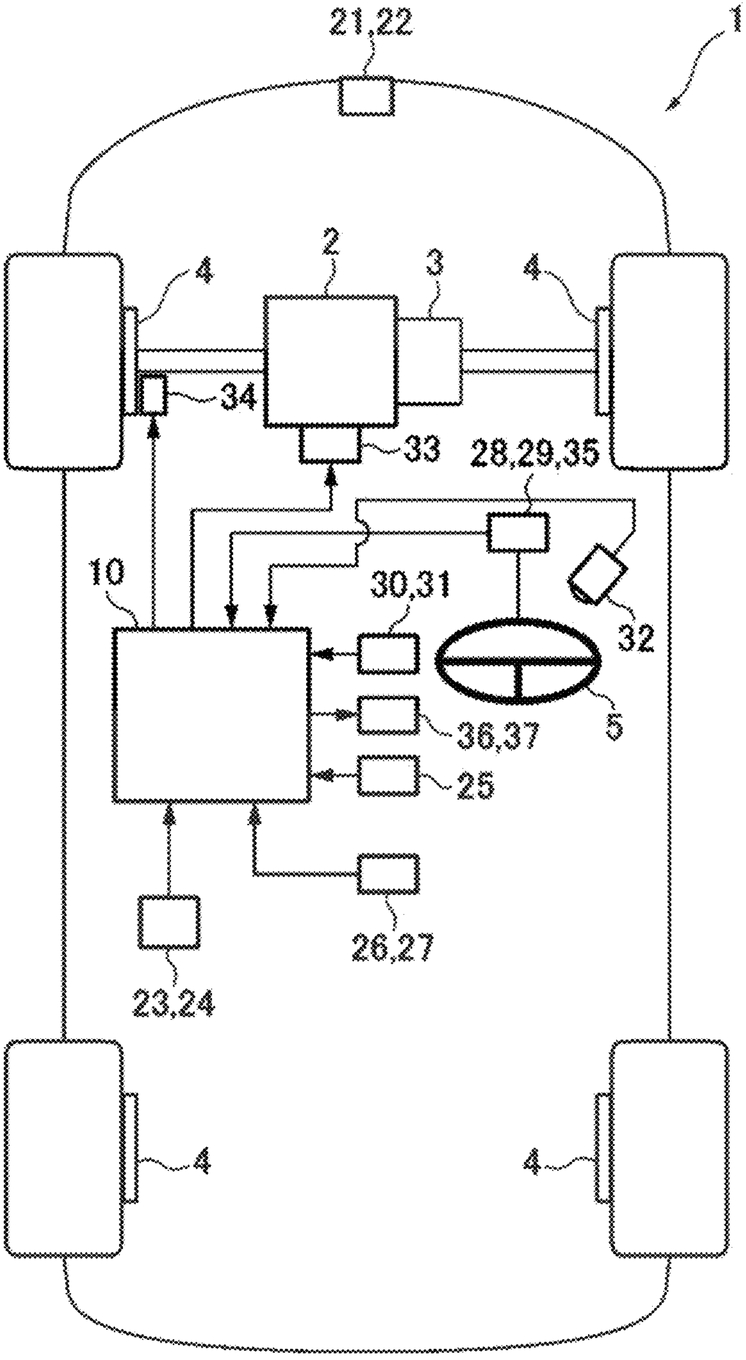
FIG. 1 is an explanatory diagram of a vehicle on which a driver abnormality sign detection device according to an embodiment is mounted.
Figure 2:
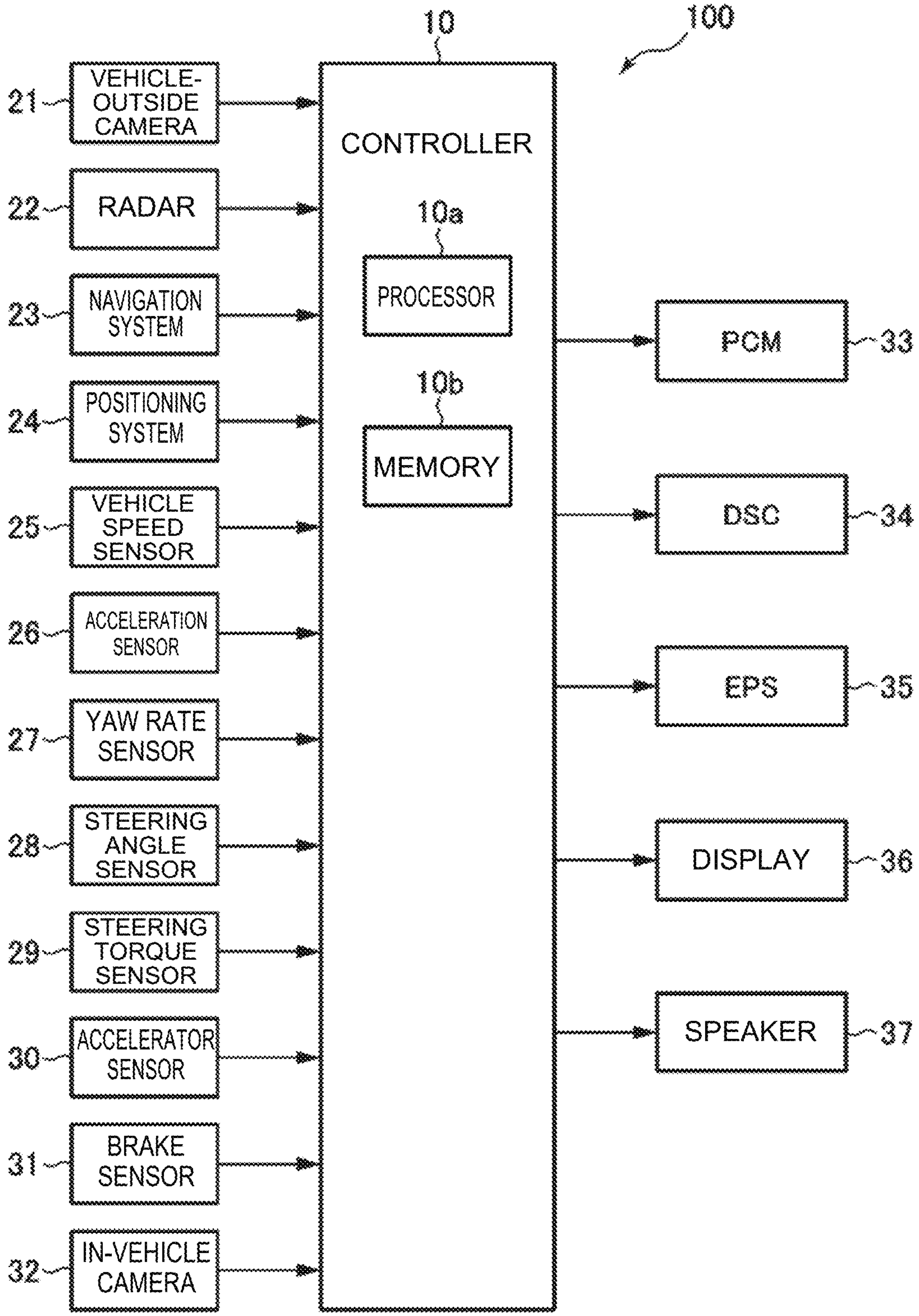
FIG. 2 is a block diagram of the driver abnormality sign detection device according to the embodiment.

First, a configuration of the driver abnormality sign detection device according to the present embodiment will be described with reference to FIG. 1 and FIG. 2. FIG. 1 is an explanatory diagram of a vehicle on which the driver abnormality sign detection device is mounted, and FIG. 2 is a block diagram of the driver abnormality sign detection device.

A vehicle includes a driving force source 2 such as an engine or an electric motor which outputs driving force, a transmission 3 which transmits the driving force output from the driving force source 2 to driving wheels, brakes 4 which exert braking force on the vehicle 1, and a steering device 5 for steering the vehicle 1.

A driver abnormality sign detection device 100 is configured to detect an abnormality sign of a driver of the vehicle 1 and to perform control of the vehicle 1 and driving assistance control as needed. As illustrated in FIG. 2, the driver abnormality sign detection device 100 has a controller 10, a plurality of sensors, a plurality of control systems, and a plurality of information output devices. The controller 10 described herein may be implemented using computer programming or engineering techniques including computer software, firmware, hardware or any combination or subset thereof. For example, the controller 10 may be non-transitory computer readable storage device having computer readable instructions that when executed by circuitry cause the circuitry to perform the methods described herein, may be circuits to performs the methods described herein, or a combination thereof.

Specifically, the plurality of sensors include a vehicle-outside camera 21 and a radar 22, which acquires traveling environment information of the vehicle 1, and a navigation system 23 and a positioning system 24, which are for detecting a position of the vehicle 1. Further, the plurality of sensors include a vehicle speed sensor 25, an acceleration sensor 26, a yaw rate sensor 27, a steering angle sensor 28, a steering torque sensor 29, an accelerator sensor 30, and a brake sensor 31, which are for detecting behavior of the vehicle 1 and a driving operation by the driver. Further, the plurality of sensors include an in-vehicle camera 32 for detecting a visual line of the driver. The plurality of control systems include a power train control module (PCM) 33 which controls the driving force source 2 and the transmission 3, a dynamic stability control system (DSC) 34 which controls the driving force source 2 and the brakes 4, and an electric power steering system (EPS) 35 which controls the steering device 5. The plurality of information output devices include a display 36 which outputs image information and a speaker 37 which outputs sound information.

Further, as other sensors, a periphery sonar which measures a distance to and a position of a peripheral structure with respect to the vehicle 1, corner radars which measures approach of peripheral structures to four corner portions of the vehicle 1, and various sensors which detect a state of the driver (for example, a heart rate sensor, an electrocardiogram sensor, a gripping force sensor of a steering wheel, and so forth) may be included.

The controller 10 executes various kinds of computation based on signals received from the plurality of sensors, transmits control signals for causing the driving force source 2, the transmission 3, the brakes 4, and the steering device 5 to appropriately act to the PCM 33, the DSC 34, and the EPS 35, and transmits, to the display 36 and the speaker 37, control signals for causing the display 36 and the speaker 37 to output desired information. The controller 10 is configured with a computer which includes one or more processors 10*a* (typically, a CPU), a memory 10*b* (such as a ROM or a RAM) which stores various programs and data, an input-output device, and so forth.

The vehicle-outside camera 21 photographs surroundings of the vehicle 1 and outputs image data. Based on the image data received from the vehicle-outside camera 21, the controller 10 specifies positions and speeds of target objects (such as a preceding vehicle, a parked vehicle, a pedestrian, a traveling road, marking lines (a lane boundary line, a white line, and a yellow line), a traffic signal, a traffic sign, a stop line, an intersection, and an obstacle, for example). Note that the vehicle-outside camera 21 corresponds to one example of a "traveling environment information acquisition device" in the present disclosure, and information acquired by the vehicle-outside camera 21 corresponds to one example of the "traveling environment information" in the present disclosure.

The radar 22 measures a position and a speed of a target object (particularly, such as a preceding vehicle, a parked vehicle, a pedestrian, or a fallen object on a traveling road). As the radar 22, for example, a millimeter wave radar can be used. The radar 22 transmits an electric wave in a moving direction of the vehicle 1 and receives a reflected wave resulting from reflection of a transmitted wave by the target object. Furthermore, based on the transmitted wave and the received wave, the radar 22 measures a distance between the vehicle 1 and the target object (for example, an inter-vehicular distance) or a relative speed of the target object with respect to the vehicle 1. Note that in the present embodiment, the distance to or the relative speed of the target object may be measured by using a laser radar, an ultrasonic sensor, or the like instead of the radar 22. Further, a position-and-speed measurement device may be configured by using the plurality of sensors. Note that the radar 22 corresponds to one example of the "traveling environment information acquisition device" in the present disclosure, and information acquired by the radar 22 corresponds to one example of the "traveling environment information" in the present disclosure.

The navigation system 23 stores map information in its internal portion and can provide the map information to the controller 10. Based on the map information and present vehicle position information, the controller 10 specifies a road, an intersection, a traffic signal, a building, or the like which is present in surroundings (particularly, in the moving direction) of the vehicle 1. The map information may be stored in the controller 10. The positioning system 24 is a GPS system and/or a gyro system and detects a position (present vehicle position information) of the vehicle 1. Note that the navigation system 23 and the positioning system 24 also correspond to examples of the "traveling environment information acquisition device" in the present disclosure, and information acquired by the navigation system 23 and the positioning system 24 corresponds to examples of the "traveling environment information" in the present disclosure.

The vehicle speed sensor 25 detects a speed of the vehicle 1 based on a rotational speed of a vehicle wheel or a drive shaft, for example. The acceleration sensor 26 detects accelerations of the vehicle 1. The accelerations include an acceleration in a front-rear direction of the vehicle 1 and an acceleration in a lateral direction (in other words, a lateral acceleration). Note that in the present specification, accelerations include not only a change rate of a speed in a direction in which the speed increases but also a change rate of the speed in a direction in which the speed decreases (in other words, deceleration). The yaw rate sensor 27 detects a yaw rate of the vehicle 1. That is, the vehicle speed sensor 25, the acceleration sensor 26, and the yaw rate sensor 27 acquire vehicle state information about a state of the vehicle 1.

The steering angle sensor 28 detects a rotation angle (steering angle) of the steering wheel of the steering device 5. The steering torque sensor 29 detects torque (steering torque) applied to a steering shaft via the steering wheel. The accelerator sensor 30 detects a pedaling amount of an accelerator pedal. The brake sensor 31 detects a pedaling amount of a brake pedal. That is, the steering angle sensor 28, the steering torque sensor 29, the accelerator sensor 30, and the brake sensor 31 detect the driving operation by the driver and correspond to examples of a "driving operation detection device" in the present disclosure, and information acquired by the steering angle sensor 28, the steering torque sensor 29, the accelerator sensor 30, and the brake sensor 31 correspond to examples of "driving operation information" in the present embodiment.

The in-vehicle camera 32 photographs the driver and outputs image data. The controller 10 detects behavior of a head of the driver and a visual line direction based on the image data received from the in-vehicle camera 32. Note that the in-vehicle camera 32 corresponds to one example of a "visual line detection device" in the present disclosure, and information acquired by the in-vehicle camera 32 corresponds to one example of the "visual line information" in the present disclosure.

The PCM 33 controls the driving force source 2 of the vehicle 1 and adjusts the driving force of the vehicle 1. For example, the PCM 33 controls a spark plug, a fuel injection valve, a throttle valve, and a variable valve mechanism of the engine, the transmission 3, an inverter which supplies electric power to the electric motor, and so forth. When vehicle 1 is to be accelerated or decelerated, the controller 10 transmits a control signal to the PCM 33 for adjusting the driving force.

The DSC 34 controls the driving force source 2 and the brakes 4 of the vehicle 1 and performs deceleration control and posture control for the vehicle 1. For example, the DSC 34 controls a liquid pressure pump and a valve unit of each of the brakes 4 and controls the driving force source 2 via the PCM 33. When the deceleration control or the posture control for the vehicle 1 is to be performed, the controller 10 transmits a control signal to the DSC 34 for adjusting the driving force or for generating braking force.

The EPS 35 controls the steering device 5 of the vehicle 1. For example, the EPS 35 controls an electric motor or the like which exerts torque on the steering shaft of the steering device 5. When the moving direction of the vehicle 1 is to be changed, the controller 10 transmits a control signal to the EPS 35 for changing a steering direction.

The display 36 is provided in front of the driver in a vehicle cabin and displays the image information to the driver. As the display 36, for example, a liquid crystal display or a head-up display is used. The speaker 37 is installed in the vehicle cabin and outputs various kinds of sound information.

[Outline of Driver Abnormality Sign Detection]

Figure 3:
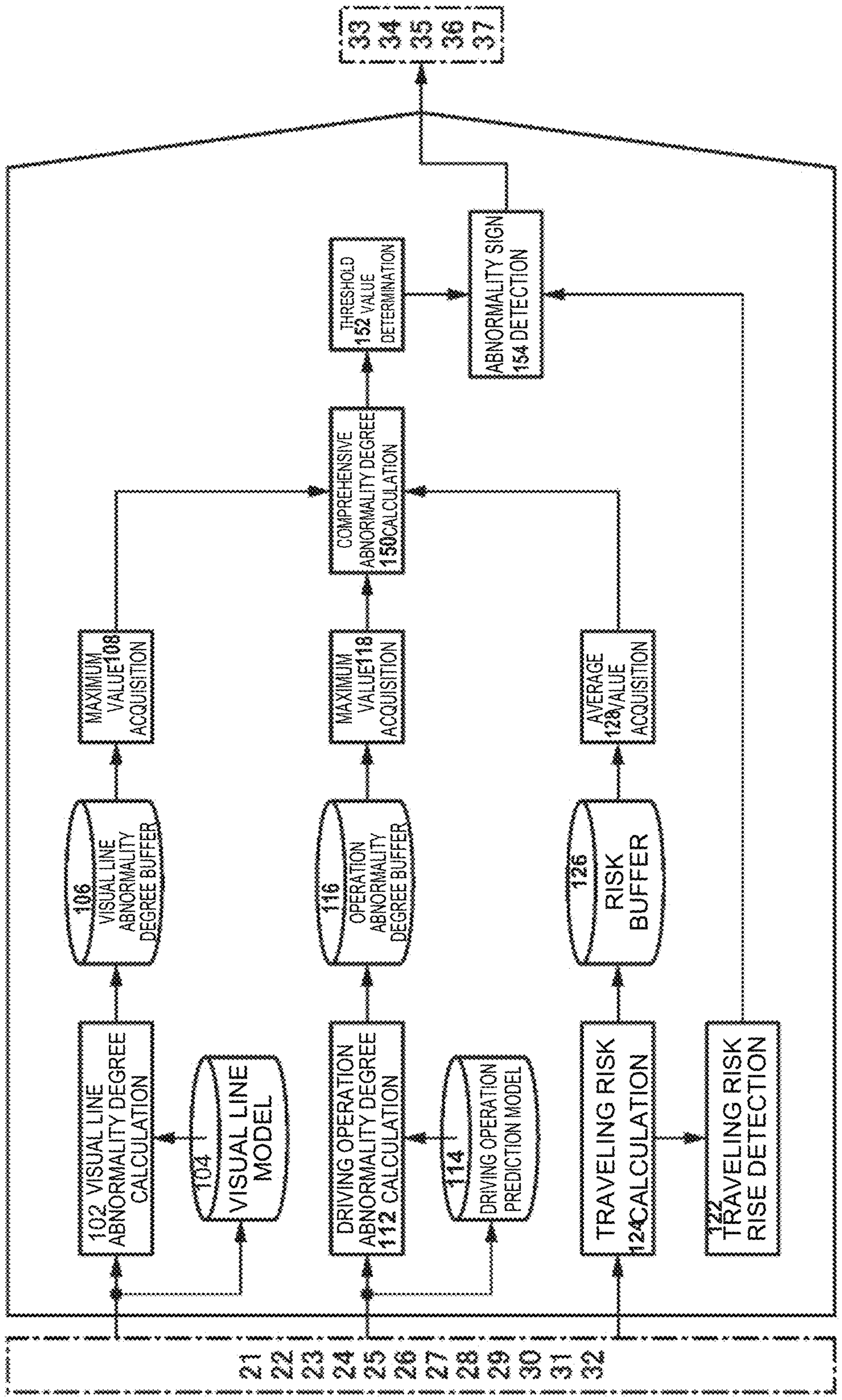
FIG. 3 is a control block diagram of abnormality sign detection according to the embodiment.

Next, a description will be made, with reference to FIG. 3, about a basic concept of driver abnormality sign detection which is executed by the controller 10 described above in the present embodiment. FIG. 3 is a control block diagram of the abnormality sign detection according to the present embodiment.

In the abnormality sign before the driver reaches an abnormality state where driving is difficult, when driving functions of the driver at least temporarily start lowering due to a mild disease, aging, or the like. When the driving functions of the driver lower, changes occur to driving actions by the driver, for example, a checking action for checking a traveling environment and an operation action for performing the driving operation of the vehicle. In addition, as a result of the changes in the driving actions, a risk (traveling risk) such as lane deviation or approach to an obstacle rises. Accordingly, the present inventors considered that by making a comprehensive determination about the changes in the driving actions and a rise of the traveling risk, early and highly precisely detection the abnormality sign without detecting obvious lowering of individual driving functions is possible.

Here, the driving functions of the driver include perception functions for perceiving a target object which is present in the traveling environment and attention functions such as a function for simultaneously seeing a plurality of target objects in the traveling environment (divided attention function), a function for selectively seeing a target object from the plurality of target objects (selective attention function), a function for switching target objects (attention shifting function), and a function for continuing to see a target object (sustained attention function). Further, the driving functions of the driver also include motor functions which are necessary for operating the steering wheel, the accelerator pedal, the brake pedal, and so forth of the vehicle 1.

As a result of a study by the present inventors, knowledge has been obtained that when the perception functions, the attention functions, or the motor functions lower, as a change in the checking action of the driver, a change occurs to motion of the visual line. For example, when the perception functions lower due to visual field deficiency or the like, a range in which the visual line is moved might become narrow. Further, when the attention functions lower, a frequency of motion of the visual line lowers, and a movement distance of the visual line becomes short. In addition, when the motor functions lower due to a paralysis of a hand or a foot, because the driver is concerned about a condition of the paralyzed hand or foot, the driver might direct the visual line in a direction of the paralyzed hand or foot. Consequently, an abnormality degree of the motion of the visual line of the driver is obtained while the motion of the visual line, which corresponds to the traveling environment and a vehicle state, in a state where no disease is present (healthy state) is set as a reference, and the change in the checking action due to lowering of the perception functions, the attention functions, or the motor functions of the driver can thereby be grasped.

Further, knowledge has also been obtained that when the perception functions, the attention functions, or the motor functions lower, as changes in the operation action of operating the steering wheel, the accelerator pedal, and the brake pedal, changes occur to operations of the steering wheel, the accelerator pedal, and the brake pedal. For example, when the motor functions lower, a delay might occur to an operation of the steering wheel or an operation of the pedal compared to the healthy state. Further, because when the perception functions or the attention functions lower, traveling environment recognition of the driver as a base of the driving operation is influenced, the operation of the steering wheel or the operation of the pedal might become unstable compared to a case of the healthy state due to the fact that the position of the own vehicle in a lane cannot be grasped well, the fact that a delay of finding of or an oversight of the target object occurs, or the like, for example. Consequently, the abnormality degree of the driving operation by the driver is obtained while the driving operation, which corresponds to the traveling environment and the vehicle state, in the healthy state is set as a reference, and the change in the operation action due to lowering of the perception functions, the attention functions, or the motor functions of the driver can thereby be grasped.

Further, in a case where the perception functions, the attention functions, or the motor functions of the driver lower, the traveling risk such as the lane deviation or approach to the obstacle rises due to an occurrence of the delay of finding of or the oversight of the target object or an unstable driving operation. According to the study by the present inventors, as for the driver in the healthy state, even when the traveling risk temporarily rises due to carelessness or unsteadiness of the operation, an appropriate correction operation is thereafter performed, and the traveling risk thus immediately lowers. Consequently, an average value of the traveling risk is maintained at a low level. On the other hand, because it gradually becomes difficult for the driver whose driving functions have lowered to perform the driving operation for lowering the traveling risk, the traveling risk progressively rises. As a result, the average value of the traveling risk reaches a higher level than that of a healthy person, and further a rising tendency of the traveling risk is retained. Consequently, the average value of and the rising tendency of the traveling risk are obtained, and an influence of the changes in the driving actions due to lowering of the motor functions, the perception functions, or the attention functions of the driver can thereby be grasped.

Accordingly, the controller 10 of the present embodiment calculates an abnormality degree of the visual line (visual line abnormality degree) of the driver based on the visual line information, the driving operation information, the traveling environment information, the vehicle state information, and head behavior information, calculates the abnormality degree of the driving operation (driving operation abnormality degree) by the driver based on the driving operation information, the traveling environment information, and the vehicle state information, and calculates the traveling risk based on the traveling environment information and the vehicle state information. Furthermore, the controller 10 is configured to calculate a comprehensive abnormality degree of the state of the driver (comprehensive abnormality degree) based on those visual line abnormality degree, driving operation abnormality degree, and traveling risk and to detect the abnormality sign of the driver based on the comprehensive abnormality degree.

Specifically, as illustrated in FIG. 3, the controller 10 acquires the visual line information and the head behavior information based on a signal received from the in-vehicle camera 32, acquires the driving operation information based on signals received from the steering angle sensor 28, the steering torque sensor 29, the accelerator sensor 30, and the brake sensor 31, and acquires the traveling environment information and the vehicle state information based on signals received from the sensors including the vehicle-outside camera 21, the radar 22, the navigation system 23, the positioning system 24, the vehicle speed sensor 25, the acceleration sensor 26, and the yaw rate sensor 27.

The controller 10 inputs the acquired driving operation information, traveling environment information, vehicle state information, and head behavior information to a visual line model 104 and calculates prediction values of the motion of the visual line (visual line prediction values) of the driver in the healthy state. As the feature amount representing the motion of the visual line, for example, an amplitude or a frequency of a saccade can be used.

Here, the saccade denotes a saccadic eye movement for catching a visual target in the central fovea of the retina and denotes eye movement in which the visual line is moved from a gaze point, at which the visual line becomes still for a predetermined time, to a next gaze point. The amplitude of the saccade denotes a movement amount in a case where the visual line of the driver moves from the gaze point to the next gaze point, and the frequency of the saccade denotes the number of occurrences of movement from the gaze point to the next gaze point in a predetermined time.

The motion of the visual line is influenced by a steering operation by the driver, the vehicle state (such as the vehicle speed, for example), the traveling environment (such as illuminance or dispersion of saliency, for example), head behavior of the driver, and so forth. Here, the saliency denotes a characteristic representing easiness of attracting a gaze of a human and denotes a visual feature amount which is decided in accordance with temporal and spatial arrangement of colors, luminance, motion, and so forth. That is, a region with high saliency in a visual field of the driver is a region which easily attracts a gaze of the driver due to a large color difference or luminance difference relative to a surrounding region or presence of large motion.

For example, in a case where the driver performs a steering operation in a situation where intersections or curves are successively present, because the driver concentrates the visual line in a direction in which the vehicle turns, dispersion of the visual line tends to decrease. Further, in a case where the vehicle speed is comparatively high on an expressway or the like, the visual line of the driver tends to be concentrated in the moving direction. Further, in a case where the illuminance of the traveling environment is comparatively low in the nighttime or the like, the visual line of the driver also tends to be concentrated in the moving direction. Further, in a case where the dispersion of the saliency around the vehicle is small (in other words, a case where regions with high saliency are gathered in a partial region of the visual field of the driver), the visual line of the driver tends to be concentrated in the region with high saliency. In addition, the visual line of the driver tends to lean to a direction in which a face of the driver is directed.

Accordingly, the visual line model 104 is configured such that when feature amounts such as the steering operation, the vehicle state, the traveling environment, and the head behavior of the driver, which influence the motion of the visual line, are input as parameters, the visual line model 104 outputs the visual line prediction values of the driver in the healthy state in a case where the influence of those is taken into consideration. Specifically, for example, reference values of the saccade frequency and amplitude in the healthy state and correction maps about the feature amounts influencing the motion of the visual line, for example, a standard deviation of an operation amount of the steering wheel (steering angle), the vehicle speed, the illuminance of the traveling environment, the dispersion of the saliency, and a standard deviation of a direction of the face of the driver are set in the visual line model 104 in advance. The reference values are corrected in accordance with each of the input feature amounts based on those correction maps, and the visual line prediction values, which reflect the influences of the steering operation, the vehicle state, the traveling environment, and the head behavior of the driver, can thereby be obtained.

Based on actual measurement values of the motion of the visual line of the driver (visual line actual measurement values), which are specified from the acquired visual line information, and the visual line prediction values, which are output by the visual line model 104 configured as described above, the controller 10 calculates the visual line abnormality degree which represents the extent that the visual line actual measurement values diverge from the visual line prediction values (visual line abnormality degree calculation 102).

For example, based on the number of saccades in a predetermined time (for example, 30 seconds), the controller 10 calculates the number of saccades for a unit time as the actual measurement value of the saccade frequency. Further, the controller 10 calculates the average value of the saccade amplitudes in a predetermined time (for example, 30 seconds) as the actual measurement value of the saccade amplitude. Furthermore, the controller 10 accumulates two-dimensional data in which a difference between the calculated actual measurement value of the saccade frequency and the prediction value output from the visual line model 104 is set as a first variable and a difference between the calculated actual measurement value of the saccade amplitude and the prediction value output from the visual line model 104 is set as a second variable. The controller 10 calculates the Mahalanobis distance between a newest data point of the two-dimensional data and a centroid (average) of an accumulated data set. Because a correlation is present between the difference between the actual measurement value and the prediction value of the saccade frequency and the difference between the actual measurement value and the prediction value of the saccade amplitude, by using the Mahalanobis distance in such a manner, a divergence degree of the motion of the visual line from the healthy state can be represented by one index. In addition, the controller 10 normalizes the calculated Mahalanobis distance by dividing that by a representative value, which is set in advance, and thereby calculates the visual line abnormality degree. As the representative value, the Mahalanobis distance in a case where the driver is in the abnormality sign can be used. That is, when the visual line abnormality degree is one, the abnormality sign of the driver is detected.

Furthermore, the controller 10 accumulates the calculated visual line abnormality degree in a buffer (visual line abnormality degree buffer 106) and acquires a maximum value of the visual line abnormality degree in a latest predetermined time (for example, 60 seconds) from the visual line abnormality degree buffer 106 (maximum value acquisition 108).

Further, the controller 10 inputs the acquired traveling environment information and vehicle state information to a driving operation prediction model 114 and calculates a prediction value of the driving operation (driving operation prediction value) of the driver in the healthy state. As feature amounts representing the driving operation, for example, an operation amount of the steering wheel (steering angle) and operation amounts of the accelerator pedal and the brake pedal (accelerator-pedal pedaling amount and brake-pedal pedaling amount) can be used.

The driving operation prediction model is configured to output the driving operation prediction value of the driver in the healthy state when the feature amount of the traveling environment or the vehicle state, which is necessary for the driving operation, is input as a parameter. Specifically, the driving operation prediction model is configured such that when the feature amount of the traveling environment such as the position of a marking lane or an obstacle in the moving direction of the vehicle 1, a vehicle speed limit, or the position or the speed of the preceding vehicle or the feature amount of the vehicle state such as the vehicle speed or the acceleration is input as a parameter, for example, the driving operation prediction model outputs, as the driving operation prediction value, the operation amount of the steering wheel which is necessary for traveling at a center of a traveling lane or the operation amounts of the accelerator pedal and the brake pedal for causing the vehicle 1 to follow the preceding vehicle or to travel at the vehicle speed limit.

Based on an actual measurement value of the driving operation of the driver (driving operation actual measurement value), which is specified from the acquired driving operation information, and the driving operation prediction value output from the driving operation prediction model, the controller 10 calculates the driving operation abnormality degree which represents the extent that the driving operation actual measurement value diverges from the driving operation prediction value (driving operation abnormality degree calculation 112).

For example, the controller 10 accumulates two-dimensional data in which a difference between an actual measurement value of the operation amount of the steering wheel and the prediction value output from the driving operation prediction model is set as a first variable and a difference between an actual measurement value of the operation amount of the accelerator pedal or the brake pedal and the prediction value output from the driving operation prediction model is set as a second variable. The controller 10 calculates the Mahalanobis distance between the newest data point of the two-dimensional data and the centroid (average) of an accumulated data set. Because a correlation is present between the difference between the actual measurement value and the prediction value of the operation amount of the steering wheel and the difference between the actual measurement value and the prediction value of a pedal operation amount, by using the Mahalanobis distance in such a manner, a divergence degree of the driving operation from the healthy state can be represented by one index. In addition, the controller 10 normalizes the calculated Mahalanobis distance by dividing that by a representative value, which is set in advance, and thereby calculates the driving operation abnormality degree. As the representative value, the Mahalanobis distance in a case where the driver is in the abnormality sign can be used. That is, when the driving operation abnormality degree is one, the abnormality sign of the driver is detected.

Furthermore, the controller 10 accumulates the calculated driving operation abnormality degree in a buffer (driving operation abnormality degree buffer 116) and acquires a maximum value of the driving operation abnormality degree in a latest predetermined time from the driving operation abnormality degree buffer 116 (maximum value acquisition 118).

Further, the controller 10 calculates the traveling risk based on the acquired traveling environment information and vehicle state information (traveling risk calculation 124). The traveling risk represents a possibility of the lane deviation, approach to the obstacle, or the like by a numerical value. For example, settings are made such that the traveling risk=0 in a case where it is predicted that the vehicle 1 will be positioned at a lane center and the distance to the obstacle will be a safe distance (for example, 1 m) or greater after a predetermined time (for example, 2 seconds), the traveling risk becomes closer to 1 as a prediction value of a distance to the lane deviation or of a distance to the obstacle, similarly, at a time after the predetermined time becomes smaller, and the traveling risk=1 in a case where it is predicted that the lane deviation will occur or the distance to the obstacle after the predetermined time will become smaller than a distance limit (for example, 0.3 m). That is, the controller 10 specifies, from the acquired traveling environment information, the position of the marking line on the traveling road in the moving direction of the vehicle 1, the position of the vehicle 1 on the traveling road, and the position and the speed of the obstacle. Further, from the acquired traveling environment information or vehicle state information, the controller 10 specifies the present speed or acceleration of the vehicle 1 and predicts the position of the vehicle 1 at a time after a predetermined time. Furthermore, based on the predicted position of the vehicle 1 and the position of the marking line or the obstacle and the speed, the controller 10 calculates the prediction value of the distance to the lane deviation of the vehicle 1 or of the distance to the obstacle at a time after a predetermined time and calculates the traveling risk based on the calculated prediction value.

Furthermore, the controller 10 accumulates the calculated traveling risk in a buffer (risk buffer 126) and acquires the average value of the traveling risk in a latest predetermined time from the risk buffer 126 (average value acquisition 128).

The controller 10 calculates the comprehensive abnormality degree from the acquired maximum value of the visual line abnormality degree, the acquired maximum value of the driving operation abnormality degree, and the acquired average value of the traveling risk (comprehensive abnormality degree calculation 150). For example, the controller 10 sets a three-dimensional vector, which has, as components, the acquired maximum value of the visual line abnormality degree, the acquired maximum value of the driving operation abnormality degree, and the acquired average value of the traveling risk, as a comprehensive abnormality degree vector in a three-dimensional orthogonal coordinate system, in which the maximum value of the visual line abnormality degree, the maximum value of the driving operation abnormality degree, and the average value of the traveling risk are set as axes, and thereby calculates a magnitude of the comprehensive abnormality degree vector as the comprehensive abnormality degree.

Figure 4:
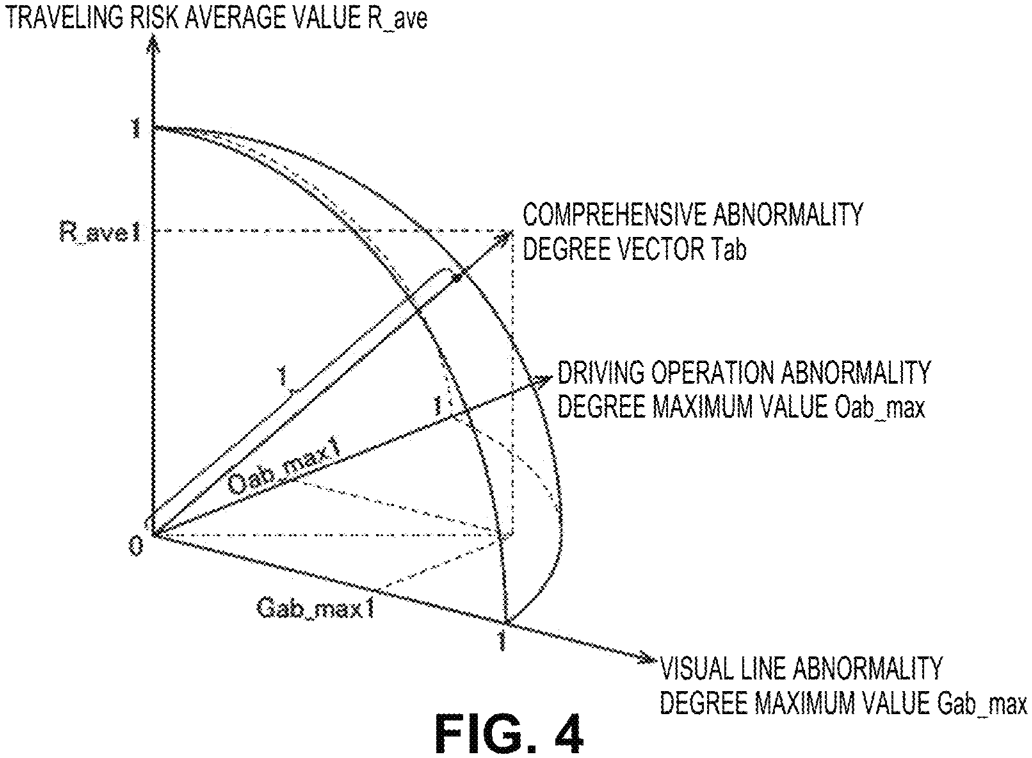
FIG. 4 is a diagram in which a comprehensive abnormality degree in the embodiment of the present invention is represented by a three-dimensional orthogonal coordinate system in which a visual line abnormality degree, a driving operation abnormality degree, and a traveling risk are set as coordinate axes.

FIG. 4 is a diagram in which the comprehensive abnormality degree is represented by the three-dimensional orthogonal coordinate system in which the visual line abnormality degree, the driving operation abnormality degree, and the traveling risk are set as coordinate axes. As illustrated in FIG. 4, when the acquired maximum value of the visual line abnormality degree is set as Gab_max, the acquired maximum value of the driving operation abnormality degree is set as Oab_max, and the acquired average value of the traveling risk is set as R_ave, the magnitude of a comprehensive abnormality degree vector Tab can be expressed as $(Gab\_max^2+Oab\_max^2+R\_ave^2)^{1/2}$. For example, in the example in FIG. 4, each of a maximum value Gab_max1 of the visual line abnormality degree, a maximum value Oab_max1 of the driving operation abnormality degree, and an average value R_ave1 of the traveling risk is smaller than one, but even in this case, the magnitude of the comprehensive abnormality degree vector Tab is larger than one. Further, when any one of the acquired maximum value of the visual line abnormality degree, the acquired maximum value of the driving operation abnormality degree, and the acquired average value of the traveling risk is one or greater, the comprehensive abnormality degree becomes one or greater.

The controller 10 determines whether or not the calculated comprehensive abnormality degree is a predetermined threshold value or greater (threshold value determination 152). In a case where the magnitude of the comprehensive abnormality degree vector which is obtained as described above is calculated as the comprehensive abnormality degree, the threshold value is one, for example, and a spherical surface with a radius of one corresponds to the threshold value in the example in FIG. 4.

Further, in a case where it is determined, based on the calculated traveling risk, that the traveling risk is rising and reaches one in a predetermined time (for example, five seconds) when a rising rate is maintained, the controller 10 detects a rise of the traveling risk (traveling risk rise detection 122).

Furthermore, in a case where the comprehensive abnormality degree is the threshold value or greater and the rise of the traveling risk is detected, the controller 10 assesses that the driver exhibits the abnormality sign. That is, the abnormality sign of the driver is detected (abnormality sign detection 154).

When the abnormality sign is detected, the controller 10 transmits the control signals for causing the driving force source 2, the transmission 3, the brakes 4, and the steering device 5 to appropriately act to the PCM 33, the DSC 34, and the EPS 35 and transmits, to the display 36 and the speaker 37, the control signals for causing the display 36 and the speaker 37 to output desired information. For example, the controller 10 causes the steering wheel to vibrate at a predetermined frequency by the EPS 35 and confirms that the driver is in the abnormality state based on a response of the driver. Further, the controller 10 causes the display 36 to output warning display and confirms that the driver is in the abnormality state based on a response of the driver to the warning display.

[Abnormality Sign Detection Process]

Figure 5:
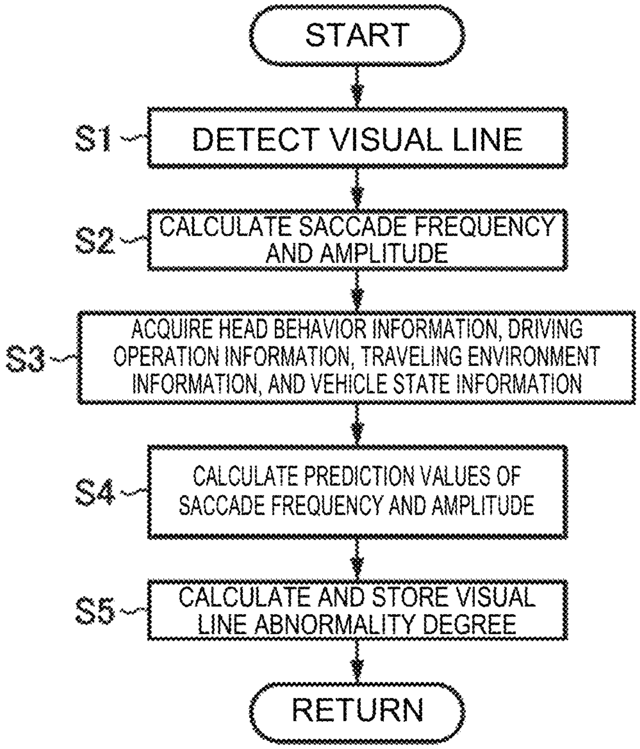
FIG. 5 is a flowchart of a visual line abnormality degree calculation process according to the embodiment.
Figure 6:
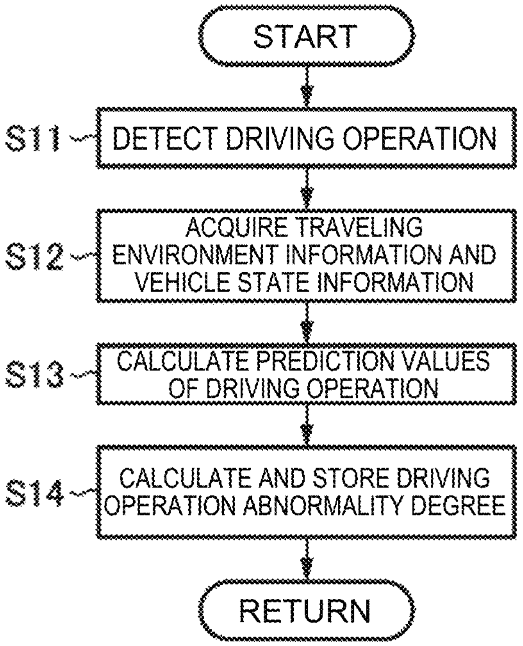
FIG. 6 is a flowchart of a driving operation abnormality degree calculation process according to the embodiment.
Figure 7:
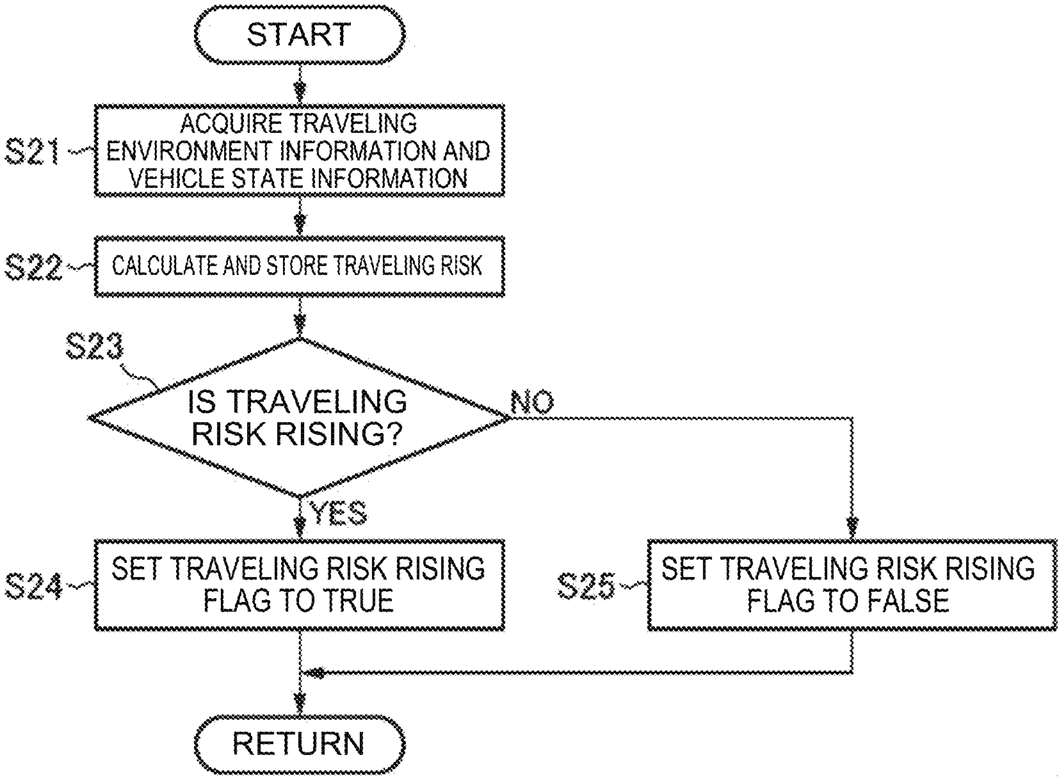
FIG. 7 is a flowchart of a traveling risk calculation process according to the embodiment.
Figure 8:
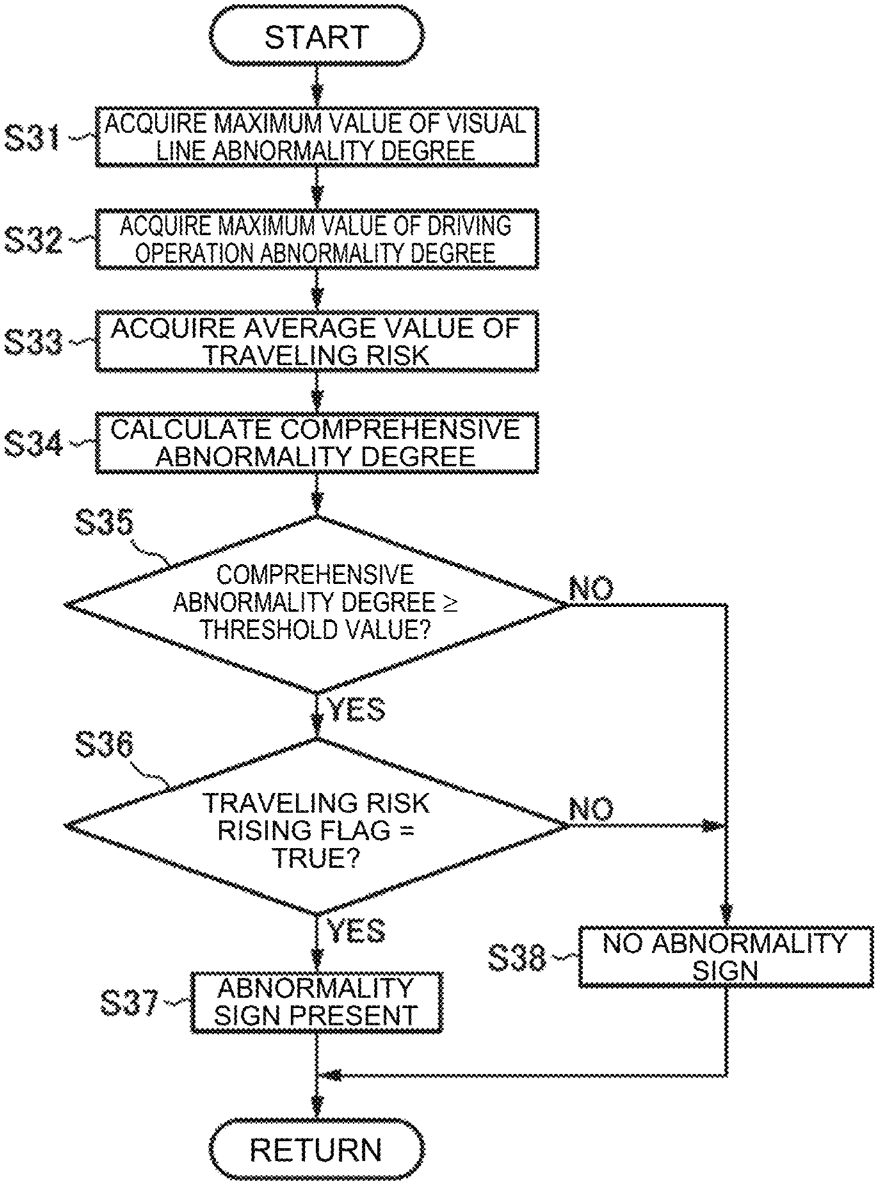
FIG. 8 is a flowchart of an abnormality sign detection process according to the embodiment.

Next, a description will be made, with reference to FIG. 5 to FIG. 8, about a flow of a detection process of the abnormality sign by the driver abnormality sign detection device 100 of the present embodiment. FIG. 5 is a flowchart of a visual line abnormality degree calculation process, FIG. 6 is a flowchart of a driving operation abnormality degree calculation process, FIG. 7 is a flowchart of a traveling risk calculation process, and FIG. 8 is a flowchart of an abnormality sign detection process. The visual line abnormality degree calculation process, the driving operation abnormality degree calculation process, the traveling risk calculation process, and the abnormality sign detection process are started in a case where a power source of the vehicle 1 is turned ON and are in parallel and repeatedly executed by the controller 10 in a predetermined cycle (for example, every 0.05 to 0.2 seconds).

When the visual line abnormality degree calculation process in FIG. 5 is started, the controller 10 detects the visual line of the driver based on the signal received from the in-vehicle camera 32 (step S1). Next, based on the detected visual line of the driver, the controller 10 calculates the actual measurement values of the saccade frequency and amplitude (step S2).

Further, the controller 10 acquires the head behavior information based on the signal received from the in-vehicle camera 32, acquires the driving operation information based on the signals received from the steering angle sensor 28, the steering torque sensor 29, the accelerator sensor 30, and the brake sensor 31, and acquires the traveling environment information and the vehicle state information based on the signals received from the sensors including the vehicle-outside camera 21, the radar 22, the navigation system 23, the positioning system 24, the vehicle speed sensor 25, the acceleration sensor 26, and the yaw rate sensor 27 (step S3). Then, the controller 10 inputs the information acquired in step S3 to the visual line model 104 and calculates the prediction values of the saccade frequency and amplitude (step S4).

Next, based on the actual measurement values of the saccade frequency and amplitude which are calculated in step S2 and on the prediction values of the saccade frequency and amplitude which are calculated in step S4, the controller 10 calculates the visual line abnormality degree and stores that in the buffer 106 (step S5). As described above, for example, the controller 10 calculates the Mahalanobis distance between the newest data point of the two-dimensional data, in which the difference between the actual measurement value and the prediction value of the saccade frequency is set as the first variable and the difference between the actual measurement value and the prediction value of the saccade amplitude is set as the second variable, and the centroid (average) of the data set which is accumulated so far. In addition, the controller 10 normalizes the calculated Mahalanobis distance by dividing that by the representative value, which is set in advance, and thereby calculates the visual line abnormality degree. After step S5, the controller 10 finishes the visual line abnormality degree calculation process.

When the driving operation abnormality degree calculation process in FIG. 6 is started, based on the signals received from the steering angle sensor 28, the steering torque sensor 29, the accelerator sensor 30, and the brake sensor 31, the controller 10 detects the driving operation by the driver, specifically, the operation amount of the steering wheel and the operation amounts of the accelerator pedal and the brake pedal (step S11).

Further, based on the signals received from the sensors including the vehicle-outside camera 21, the radar 22, the navigation system 23, the positioning system 24, the vehicle speed sensor 25, the acceleration sensor 26, and the yaw rate sensor 27, the controller 10 acquires the traveling environment information and the vehicle state information (step S12). Then, the controller 10 inputs the information acquired in step S12 to the driving operation prediction model and calculates the prediction values of the driving operation (step S13).

Next, based on the actual measurement values of the driving operation of the driver which are detected in step S11 and on the prediction values of the driving operation which are calculated in step S13, the controller 10 calculates the driving operation abnormality degree and stores that in the buffer 116 (step S14). As described above, for example, the controller 10 calculates the Mahalanobis distance between the newest data point of the two-dimensional data, in which the difference between the actual measurement value and the prediction value of the operation amount of the steering wheel is set as the first variable and the difference between the actual measurement value and the prediction value of the operation amount of the accelerator pedal or the brake pedal is set as the second variable, and the centroid (average) of the data set which is accumulated so far. In addition, the controller 10 normalizes the calculated Mahalanobis distance by dividing that by the representative value, which is set in advance, and thereby calculates the driving operation abnormality degree. After step S14, the controller 10 finishes the driving operation abnormality degree calculation process.

When the traveling risk calculation process in FIG. 7 is started, based on the signals received from the sensors including the vehicle-outside camera 21, the radar 22, the navigation system 23, the positioning system 24, the vehicle speed sensor 25, the acceleration sensor 26, and the yaw rate sensor 27, the controller 10 acquires the traveling environment information and the vehicle state information (step S21).

Next, based on the traveling environment information and the vehicle state information which are acquired in step S21, the controller 10 calculates the traveling risk and stores that in the buffer 126 (step S22). As described above, for example, the controller 10 specifies, from the acquired traveling environment information, the position of the marking line on the traveling road in the moving direction of the vehicle 1, the position of the vehicle 1 on the traveling road, and the position and speed of the obstacle. Further, from the acquired traveling environment information or vehicle state information, the controller 10 specifies the present speed or acceleration of the vehicle 1 and predicts the position of the vehicle 1 at a time after the predetermined time. Furthermore, based on the position of the vehicle 1 and the position of the marking line or the obstacle and the speed, the controller 10 calculates the prediction value of the distance to the lane deviation of the vehicle 1 or of the distance to the obstacle at a time after the predetermined time and calculates the traveling risk based on the calculated prediction value.

Next, based on the traveling risk calculated in step S22, the controller 10 determines whether or not the traveling risk is rising (step S23). As described above, for example, in a case where it is determined that the traveling risk is rising and reaches one in the predetermined time when the rising rate is maintained, the controller 10 determines that the traveling risk is rising.

As a result, in a case where it is determined that the traveling risk is rising (Yes in step S23), that is, a case where the controller 10 detects a rise of the traveling risk, the controller 10 sets a traveling risk rising flag to TRUE (step S24). On the other hand, in a case where it is not determined that the traveling risk is rising (No in step S23), the controller 10 sets the traveling risk rising flag to FALSE (step S25). After a process of step S24 or S25, the controller 10 finishes the traveling risk calculation process.

When the abnormality sign detection process in FIG. 8 is started, the controller 10 acquires the maximum value of the visual line abnormality degree in the latest predetermined time (for example, 60 seconds) from the visual line abnormality degree buffer 106 (step S31).

Further, the controller 10 acquires the maximum value of the driving operation abnormality degree in the latest predetermined time from the driving abnormality degree buffer 116 (step S32).

Furthermore, the controller 10 acquires the average value of the traveling risk in the latest predetermined time from the risk buffer 126 (step S33).

Next, the controller 10 calculates the comprehensive abnormality degree from the acquired maximum value of the visual line abnormality degree, the acquired maximum value of the driving operation abnormality degree, and the acquired average value of the traveling risk (step S34). As described above, for example, the controller 10 sets the three-dimensional vector, which has, as the components, the acquired maximum value of the visual line abnormality degree, the acquired maximum value of the driving operation abnormality degree, and the acquired average value of the traveling risk, as the comprehensive abnormality degree vector in the three-dimensional orthogonal coordinate system, in which the maximum value of the visual line abnormality degree, the maximum value of the driving operation abnormality degree, and the average value of the traveling risk are set as the axes, and thereby calculates the comprehensive abnormality degree vector and its magnitude as the comprehensive abnormality degree.

Next, the controller 10 determines whether or not the comprehensive abnormality degree calculated in step S34 is the predetermined threshold value or greater (step S35).

In a case where it is determined that the comprehensive abnormality degree is the predetermined threshold value or greater (Yes in step S35), the controller 10 determines whether or not the traveling risk rising flag is set to TRUE (step S36).

In a case where it is determined that the traveling risk rising flag is set to TRUE (Yes in step S36), the controller 10 assesses that the driver is exhibiting the abnormality sign. That is, the abnormality sign of the driver is detected (step S37).

On the other hand, in a case where it is not determined that the comprehensive abnormality degree is the predetermined threshold value or greater in step S35 (that is, a case where the comprehensive abnormality degree is smaller than the threshold value) (No in step S35) or in a case where it is not determined that the traveling risk rising flag is set to TRUE in step S36 (that is, a case where the traveling risk rising flag is set to FALSE) (No in step S36), the controller 10 assesses that the driver does not exhibit the abnormality sign. That is, the abnormality sign of the driver is not detected (step S38). After a process of step S37 or S38, the controller 10 finishes the abnormality sign detection process.

Note that in the above-described embodiment, a description is made about a case where the head behavior information, the driving operation information, the traveling environment information, and the vehicle state information are input to the visual line model 104 and the visual line prediction values are thereby calculated, but the visual line prediction values may be obtained by another calculation method. For example, the visual line prediction values are in advance stored for each of the traveling environment and the vehicle state, and the visual line prediction values corresponding to the present traveling environment or vehicle state may thereby be acquired. Alternatively, machine learning is performed for the actual measurement values of the visual line of the driver in the healthy state, and the visual line prediction values may thereby be obtained. For example, a visual line model 104 may be a trained machine learning model, wherein training the machine learning model includes feeding the machine learning model training data based on a variety of driving situations and how a normal driver responds, i.e., motion of the normal drive's visual line.

Further, in the above-described embodiment, a description is made about a case where the visual line abnormality degree and the driving operation abnormality degree are calculated by using the Mahalanobis distance, but the visual line abnormality degree and the driving operation abnormality degree may be obtained by another calculation method. For example, the differences between the respective actual measurement values and prediction values of the saccade frequency and amplitude are normalized, a value is composed of the normalized differences, and the composed value may thereby be used as the visual line abnormality degree. For example, the differences between the respective actual measurement values and prediction values of the operation amount of the steering wheel and the operation amount of the pedal are normalized, a value is composed of the normalized differences, and the composed value may thereby be used as the driving operation abnormality degree.

Further, in the above-described embodiment, feature amounts representing the motion of the visual line, the saccade frequency and amplitude are used, but either one of the saccade frequency and amplitude may be used.

Further, in the above-described embodiment, feature amounts representing the driving operation, the operation amounts of the steering wheel, the accelerator pedal, and the brake pedal are used, but any one or two of the operation amounts of the steering wheel, the accelerator pedal, and the brake pedal may be used.

Further, in the above-described embodiment, the three-dimensional vector which has, as the components, the maximum value of the visual line abnormality degree, the maximum value of the driving operation abnormality degree, and the average value of the traveling risk is set as the comprehensive abnormality degree vector and the magnitude of the comprehensive abnormality degree vector is calculated as the comprehensive abnormality degree, but the comprehensive abnormality degree may be obtained by another calculation method. For example, the total sum or average value of the maximum value of the visual line abnormality degree, the maximum value of the driving operation abnormality degree, and the average value of the traveling risk may be calculated as the comprehensive abnormality degree.

Working and Effects

Next, a description will be made about working and effects of the driver abnormality sign detection device 100 of the above-described present embodiment.

Because the controller 10 calculates the visual line abnormality degree which represents the extent that the actual measurement values of the visual line diverge from the prediction values of the visual line, calculates the driving operation abnormality degree which represents the extent that the actual measurement values of the driving operation diverge from the prediction values of the driving operation, calculates the traveling risk of the vehicle 1, and detects the abnormality sign of the driver in a case where the comprehensive abnormality degree obtained by combining the visual line abnormality degree, the driving operation abnormality degree, and the traveling risk is the predetermined threshold value or greater, a comprehensive determination is made about the changes in the checking action and the operation action of the driver and a rise of the traveling risk, and the abnormality sign can thereby be detected. Consequently, even at a sufficiently early stage before the driver reaches the abnormality state where driving is difficult, such as a stage at which lowering of the individual driving functions of the driver cannot be detected, the abnormality sign can early and highly precisely be detected.

Further, because the controller 10 acquires the maximum value of the visual line abnormality degree and the maximum value of the driving operation abnormality degree in the latest predetermined time and calculates the comprehensive abnormality degree by combining the maximum value of the visual line abnormality degree, the maximum value of the driving operation abnormality degree, and the traveling risk, even in a case where the change in the checking action or the operation action of the driver is temporary and does not continue, the abnormality sign of the driver can be detected based on the comprehensive abnormality degree which reflects the change. Consequently, the abnormality sign can more certainly be detected.

Further, because the controller 10 acquires the average value of the traveling risk in the latest predetermined time and calculates the comprehensive abnormality degree by combining the maximum value of the visual line abnormality degree, the maximum value of the driving operation abnormality degree, and the average value of the traveling risk, the abnormality sign of the driver can be detected based on the comprehensive abnormality degree which reflects the fact that the traveling risk increases not temporarily but averagely as a result of the changes in the driving actions of the driver. Consequently, misdetection of the abnormality sign due to accidental changes or the like in the driving actions, which are not caused by a disease of the driver, can be prevented, and the abnormality sign can more accurately be detected.

Further, because the controller 10 determines that the abnormality sign of the driver is detected in a case where the comprehensive abnormality degree is the predetermined threshold value or greater and a rise of the traveling risk is detected, the abnormality sign of the driver can be detected in a case where the traveling risk rises as a result of the changes in the driving actions of the driver and the possibility of the lane deviation or approach to the obstacle increases. Consequently, misdetection of the abnormality sign due to temporary changes or the like in the driving actions, which are not caused by the disease of the driver, can be prevented, and the abnormality sign can more accurately be detected.

Further, because the controller 10 calculates, as the visual line abnormality degree, the extent that the actual measurement value of the saccade diverges from the prediction value of the saccade, the change in the checking action due to lowering of the perception functions, the attention functions, or the motor functions of the driver can be grasped by using a change in the saccade.

Further, because the controller 10 calculates, as the driving operation abnormality degree, the extent that the actual measurement values of the operation amounts of the steering wheel, the accelerator pedal, and/or the brake pedal diverge from the prediction values of the operation amounts, the change in the operation action due to lowering of the perception functions, the attention functions, or the motor functions of the driver can be grasped by using changes in the operation amounts of the steering wheel, the accelerator pedal, and/or the brake pedal.

The scope of the invention is indicated by the appended claims, rather than the foregoing description.

REFERENCE SIGNS LIST

- 1 vehicle
- 10 controller
- **10*a*** processor
- **10*b*** memory
- 100 driver abnormality sign detection device
- 21 vehicle-outside camera
- 22 radar
- 23 navigation system
- 24 positioning system
- 25 vehicle speed sensor
- 26 acceleration sensor
- 27 yaw rate sensor
- 28 steering angle sensor
- 29 steering torque sensor
- 30 accelerator sensor
- 31 brake sensor
- 32 in-vehicle camera
- 33 PCM
- 34 DSC
- 35 EPS
- 36 display
- 37 speaker

The invention claimed is:

1. A driver abnormality sign detection device detecting an abnormality sign of a driver driving a vehicle, the driver abnormality sign detection device comprising:

a control circuit configured to detect the abnormality sign of the driver based on visual line information acquired from a visual line detector, driving operation information acquired from a driving operation detector, and traveling environment information acquired from a traveling environment detector, wherein the control circuit is configured to acquire a predicted visual line based on the traveling environment information, acquire an actual visual line based on the visual line information, calculate a visual line abnormality degree which represents an extent that the actual visual line differs from the predicted visual line, acquire a predicted driving operation based on the traveling environment information, acquire an actual driving operation based on the driving operation information, calculate a driving operation abnormality degree which represents an extent that the actual driving operation differs from the predicted driving operation, calculate a traveling risk of the vehicle based on the traveling environment information, calculate a comprehensive abnormality degree by combining the visual line abnormality degree, the driving operation abnormality degree, and the traveling risk, on condition that the comprehensive abnormality degree is equal to or greater than a predetermined threshold value, detect the abnormality sign of the driver, and, in response to detecting the abnormality sign of the driver, output a control signal to at least one of: a display of the vehicle, a speaker of the vehicle, a driving force source of the vehicle, a transmission of the vehicle, a brake of the vehicle, and a steering device of the vehicle, to control operation of the vehicle.

2. The driver abnormality sign detection device according to claim 1, wherein the control circuit is configured to:

determine a maximum visual line abnormality degree and a maximum driving operation abnormality degree within a predetermined time; and calculate a comprehensive abnormality degree by combining the maximum visual line abnormality degree, the maximum driving operation abnormality degree, and the traveling risk.

3. The driver abnormality sign detection device according to claim 2, wherein the control circuit is configured to:

calculate an average traveling risk in the predetermined time; and calculate a comprehensive abnormality degree by combining the maximum visual line abnormality degree, the maximum driving operation abnormality degree, and the average traveling risk.

4. The driver abnormality sign detection device according to claim 3, wherein, on condition that the comprehensive abnormality degree is equal to or greater than the predetermined threshold value and the traveling risk is increasing, the control circuit is configured to detect the abnormality sign of the driver.

5. The driver abnormality sign detection device according to claim 4, wherein the control circuit is configured to determine that the traveling risk is increasing based on an average of the traveling risk in the predetermined time.

6. The driver abnormality sign detection device according to claim 3, wherein the control circuit is configured to:

acquire a predicted saccade of the driver based on the traveling environment information, acquire an actual saccade of the driver based on the visual line information, and calculate, as the visual line abnormality degree, a difference between the actual saccade and the predicted saccade.

7. The driver abnormality sign detection device according to claim 3, wherein the control circuit is configured to:

acquire prediction operation amounts of a steering wheel, an accelerator pedal, and/or a brake pedal based on the traveling environment information, acquire actual operation amounts based on the driving operation information, and calculate, as the driving operation abnormality degree, a difference between the actual operation amounts and the predicted operation amounts.

8. The driver abnormality sign detection device according to claim 1, wherein the control circuit is configured to calculate the visual line abnormality degree, the driving operation abnormality degree, the traveling risk, and the comprehensive abnormality degree in a predetermined cycle.

9. The driver abnormality sign detection device according to claim 1, wherein the control circuit is configured to calculate the visual line abnormality degree, the driving operation abnormality degree, and the traveling risk, in parallel.

10. The driver abnormality sign detection device according to claim 1, wherein, on condition that the comprehensive abnormality degree is equal to or greater than the predetermined threshold value and the traveling risk is increasing, the control circuit is configured to detect the abnormality sign of the driver.

11. The driver abnormality sign detection device according to claim 10, wherein the control circuit is configured to determine that the traveling risk is increasing based on an average of the traveling risk in a predetermined time.

12. The driver abnormality sign detection device according to claim 1, wherein the control circuit is configured to:

acquire a predicted saccade of the driver based on the traveling environment information, acquire an actual saccade of the driver based on the visual line information, and calculate, as the visual line abnormality degree, a difference between the actual saccade and the predicted saccade.

13. The driver abnormality sign detection device according to claim 1, wherein the control circuit is configured to:

acquire prediction operation amounts of a steering wheel, an accelerator pedal, and/or a brake pedal based on the traveling environment information, acquire actual operation amounts based on the driving operation information, and calculate, as the driving operation abnormality degree, a difference between the actual operation amounts and the predicted operation amounts.

14. The driver abnormality sign detection device according to claim 1, wherein the control circuit is configured to output a visual, audible, and/or tactile alarm notifying the driver.

15. The driver abnormality sign detection device according to claim 14, wherein the tactile alarm is to vibrate a steering wheel.

16. A driver abnormality sign detection device detecting an abnormality sign of a driver driving a vehicle, the driver abnormality sign detection device comprising:

a control circuit configured to detect the abnormality sign of the driver based on visual line information acquired from a visual line detector, driving operation information acquired from a driving operation detector, and traveling environment information acquired from a traveling environment detector, wherein the control circuit is configured to run a visual line model, using driving operation and traveling environment as inputs, that outputs a predicted visual line of the driver in a healthy state;

run a driving operation prediction model, using the traveling environment as an input, that outputs a predicted driving operation value of the driver in the healthy state;

acquire an actual visual line based on the visual line information, calculate a visual line abnormality degree which represents a difference between the actual visual line and the prediction visual line;

acquire an actual driving operation based on the driving operation information, calculate a driving operation abnormality degree that represents a difference between the actual driving operation and the prediction driving operation;

calculate a traveling risk of the vehicle based on the traveling environment information;

calculate a comprehensive abnormality degree by combining the visual line abnormality degree, the driving operation abnormality degree, and the traveling risk;

on condition that the comprehensive abnormality degree is a predetermined threshold value or greater, detect the abnormality sign of the driver; and in response to detecting the abnormality sign of the driver, output a control signal to at least one of: a display of the vehicle, a speaker of the vehicle, a driving force source of the vehicle, a transmission of the vehicle, a brake of the vehicle, and a steering device of the vehicle, to control operation of the vehicle.

17. The driver abnormality sign detection device according to claim 16, wherein the control circuit is configured to:

determine a maximum visual line abnormality degree and a maximum driving operation abnormality degree within a predetermined time; and calculate a comprehensive abnormality degree by combining the maximum visual line abnormality degree, the maximum driving operation abnormality degree, and the traveling risk.

18. The driver abnormality sign detection device according to claim 16, wherein the control circuit is configured to:

calculate an average traveling risk in a predetermined time; and calculate a comprehensive abnormality degree by combining the maximum visual line abnormality degree, the maximum driving operation abnormality degree, and the average traveling risk.

19. The driver abnormality sign detection device according to claim 16, wherein, on condition that the comprehensive abnormality degree is equal to or greater than the predetermined threshold value and the traveling risk is increasing, the control circuit is configured to detect the abnormality sign of the driver.

20. A non-transitory computer readable storage device having computer readable instructions that when executed by circuitry cause the circuitry to:

acquire a predicted visual line based on traveling environment information of a vehicle, acquire an actual visual line of a driver of the vehicle based on visual line information, calculate a visual line abnormality degree based on a difference between the actual visual line and the predicted visual line, acquire a predicted driving operation based on the traveling environment information, acquire an actual driving operation based on driving operation information, calculate a driving operation abnormality degree based on a difference between the actual driving operation differs from the predicted driving operation, calculate a traveling risk of based on the traveling environment information, calculate a comprehensive abnormality degree by combining the visual line abnormality degree, the driving operation abnormality degree, and the traveling risk, on condition that the comprehensive abnormality degree is equal to or greater than a predetermined threshold value, detect an abnormality sign of the driver, and in response to detecting the abnormality sign of the driver, output a control signal to at least one of: a display of the vehicle, a speaker of the vehicle, a driving force source of the vehicle, a transmission of the vehicle, a brake of the vehicle, and a steering device of the vehicle, to control operation of the vehicle.

* * * * *